United States Patent [19]
Gust et al.

[11] 3,860,445
[45] Jan. 14, 1975

[54] METHOD FOR PRODUCING REFRACTORY CARBIDE COATINGS ON GRAPHITE

[75] Inventors: William H. Gust, Lafayette; Richard A. Heckman, Livermore; Wallace E. Voreck, Jr., Alamo, all of Calif.

[73] Assignee: The United States of America as represented by the United States Atomic Energy Commission, Washington, D.C.

[22] Filed: Mar. 10, 1959

[21] Appl. No.: 798,555

[52] U.S. Cl. ............ 117/118, 117/46 CC, 117/228, 117/95, 117/DIG. 11
[51] Int. Cl. .............................................. B44d 5/12
[58] Field of Search ............ 117/118, 228, 221, 95, 117/46, 71, 8, DIG. 11; 204/193.38; 29/474.1, 474.2, 474.3, 474.4, 471.1, 528, 423

[56] References Cited
UNITED STATES PATENTS

| | | | |
|---|---|---|---|
| 1,568,369 | 1/1926 | Everett | 29/423 |
| 2,030,695 | 2/1936 | Erber | 117/118 X |
| 2,876,139 | 3/1959 | Flowers | 117/114 X |
| 2,910,379 | 10/1959 | Curinsky | 117/118 X |
| 2,929,741 | 3/1960 | Steinberg | 117/118 X |

*Primary Examiner*—Harvey E. Behrend
*Attorney, Agent, or Firm*—John A. Horan; F. A. Robertson

EXEMPLARY CLAIM

1. A process for coating graphite with an adherent, continuous layer of metallic carbide comprising the steps of disposing a quantity of metal selected from the group consisting of molybdenum, niobium and zirconium in contiguous gas permeable relation with a first piece of graphite, superimposing a graphite clamping means of identical surface shape over said metal and said graphite piece, adjusting said graphite clamping means and said graphite piece to maintain a tolerance of about 1 mil between said metal and at least one contiguous graphite surface degassing said assembly, enclosing said graphite-metal interfaces within a nonreactive gaseous atmosphere, quickly heating said assembly to a temperature at which said metal carburizes, cooling said assembly and mechanically separating and removing said graphite clamping means from said adherent coating.

15 Claims, 1 Drawing Figure

PATENTED JAN 14 1975
3,860,445
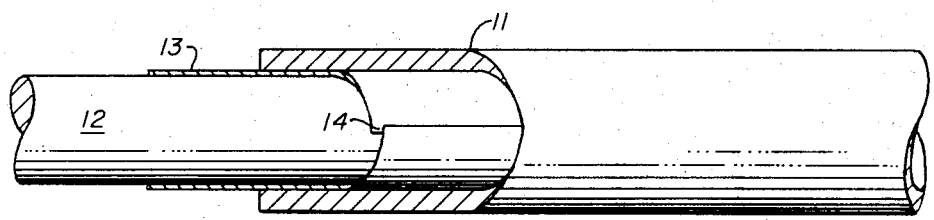
INVENTORS
WILLIAM H. GUST
RICHARD A. HECKMAN
BY WALLACE E. VORECK
ATTORNEY

METHOD FOR PRODUCING REFRACTORY CARBIDE COATINGS ON GRAPHITE

This invention relates to an improved method for producing refractory coatings of metallic carbides on graphite surfaces. More particularly, this invention relates to an improved method for carburizing refractory metals directly onto graphite surfaces, particularly onto the interiors of graphite tubes, using a mandrel or supporting means to hold the metal in position against the area to be coated.

In the present age of nuclear reactors, high speed missiles and jet or rocket propulsion engines and in many other technological fields there are ever increasing needs for refractory structures and surfaces which are stable and retain strength at much higher operating temperatures than heretofore employed and often in the presence of oxidizing or reducing atmospheres, ionizing radiation, high pressures or vacuums, and other severe and unusual conditions which ordinary materials of construction will not withstand. Graphitic carbon is a material which admirably satisfies many of the necessary requirements in this field. Graphite possesses highly desirable properties including low densities, high melting or sublimation point and high structural strengths at higher temperatures, permitting its use where most other structural materials, including common metals, are not satisfactory. In addition, graphite has a low neutron absorption cross-section while possessing the adequate moderating capacity required in nuclear reactors and associated systems.

However, the normal properties of graphite are inadequate in certain respects and in particular environments. Graphtie erodes and corrodes at high gas pressures, velocities and temperatures. Many gases and other materials react with graphite or are absorbed in an undesirable manner in certain environments. To alleviate this difficulty, in nuclear reactors, for example, graphite moderator blocks have been contained within a nonreactive metal such as zirconium or aluminum to prevent absorption of or reaction with the coolant. However, in gas cooled reactors and especially in mobile, light-weight, compact reactors having single piece graphite cores, this form of construction is disadvantageous due to bulk, low structural strength and other factors.

In addition to the problem of finding or selecting a graphite coating which has the desired properties, there is also the problem of applying the coating in such a manner that an adhesive bond between the graphite and the coating will be obtained. With carbide coatings the metal is of necessity generally placed upon the graphite by one of several methods and then carburized in place. In the past this has placed severe limitations on the several materials known to have good coating properties, since many of the metals either cannot be dispersed properly over the graphite or else uneven or nonadherent coatings result.

There has now been discovered a method of producing tenacious metallic carbide coatings on graphite surfaces using a mandrel or other supporting means to hold a refractory metal in gas permeable contact with the surface to be coated during a critical heating sequence under controlled atmospheric conditions. The method is most easily applied to coating the interiors of graphite tubes with niobium, zirconium, or molybdenum. Briefly, the process comprises wrapping a thin foil of the metal selected tightly about a graphite mandrel, the diameter of the mandrel being preselected to provide a tolerance of the order of 1 mil when the mandrel and the foil thereon are inserted into the bore to be coated. The assembly is deposed in a furnace, preferably degassed, and then preferably provided with an atmosphere selected according to the metal being used, at 3 to 5 atmospheres pressure. The assembly is quickly heated to the carburization point of the metal. At the completion of carburization there results a tenacious, high temperature, corrosion resistant carbide coating bonded to both the tube wall and the mandrel. The mandrel is removed by mechanical means, such as sand blasting or drilling. Many obvious alternative embodiments are also possible, such as the use of graphite clamping means to hold the metal against flat or curved graphite surfaces. Metal powders may be used. Alternate sheets of different metals may be used to produce double coatings.

Using the method, there results a coating of a metallic carbide which under proper conditions may be as much as 20 or more mils in thickness, uniform over the entire area coated at all angles and positions from the horizontal, and so tightly adherent that the bond cannot be disrupted without the destruction of the graphite interface. The thickest, most adherent coatings are obtained only when a gaseous atmosphere is used which is selected with respect to each metal. Such results are not attained by the simple heating of graphite in contact with a metal unless the graphite and metal surfaces are completely degassed and critical time-heating sequences are employed using specifications more rigid than presently taught in the art. Specifically only spotty or non-adherent coatings are obtained unless the mandrel and special controlled atmosphere are used, other variables being held constant.

Accordingly, an object of the invention is to provide refractory metallic carbide coatings on graphite surfaces, and a method of producing same.

A further object of the invention is to provide metallic niobium, molybdenum, and zirconium carbide coatings on graphite for use in high temperature erosive and corrosive environments and in high temperature gas cooled nuclear reactors, and a method for producing same.

Another object of the invention is to provide a method for coating graphite with a tenacious bonded layer of a refractory metallic carbide using a mandrel or support means to insure contact during the heating step.

Another object of the invention is to provide a method for coating graphite tubes with a refractory layer of a metallic carbide by the use of a mandrel to support a foil in contact with the graphite in the presence of an atmosphere which promotes formation of an adhesive bond during carburization.

Additional objects and advantages will be seen from the following description, example and FIGURE.

The FIGURE is a perspective view, partly cut away, showing a graphite tube with the mandrel and oil thereon partly inserted.

The graphite structures 11 or surfaces to be coated as seen in the FIGURE are provided or fabricated in accordance with conventional practices. For example reactor components such as tubes may be machined graphite of the usual reactor grades. In certain gas cooled reactors, uranium impregnated graphite cores having a plurality of gas coolant passages or channels are employed. A coolant or exhaust gas such as $H_2$, $CH_4$, $NH_3$, or $N_2$ is passed through the channels while the reactor core is operating and is thereby heated to a highly elevated temperature.

There is also provided a metal foil or sheet of zirconium, molybdenum or niobium, of commercial grade purity and from 1 to 20, preferably 5 mils thick. A graphite mandrel 12 is supplied which is constructed of a grade of graphite preferably the same as that being coated. As may be seen from the cut away portion of the FIGURE, the foil 13 is wrapped tightly around the mandrel in overlapping relation indicated by 14 and the mandrel inserted into the bore or tube so that there is about a 1 mil tolerance between the foil and the surface to be coated. Preferably the materials are first cleaned with an organic solvent to remove grease and loose dirt, although this step may be omitted where the materials are known to be clean from previous history. The mandrel and foil should be carefully fitted to preclude the possibility of wrinkles or irregularities which might result in disruption of the surface continuity of the resulting coating. The assembly is then placed in an induction, resistance, or other high temperature furnace equipped to have a controlled atmosphere. Alternatively, when only tubes are to be coated, one end of each tube may be equipped with an adapter for the introduction of preselected gases into the bore; heat may also be provided by resistance heating of the graphite itself.

Since the function of the mandrel is to hold the metal in a gas-permeable contiguous relation with the graphite tubes analogous alternative means may be used to accomplish the same purpose on other surfaces, e.g., a graphite block may be used to clamp metal against a second graphite piece having the same surface shape. Metal powders may be used instead of foil where they can be evenly disposed, as on a horizontal surface. Alternate coatings of different materials are produced by disposing alternate foils of different metals on the mandrel.

The entire assembly is next subjected to heat and vacuum sufficient to degas both the metal and the graphite of at least a portion of the atmospheric and other adsorbed gases. This is necessary because, as is well known, chemi-adsorbed gases seriously impede the metallic wetting process which precedes carburization. Pumping down and flushing with nitrogen or helium generally suffices if carried out for periods of 30 minutes or longer although less time is required. Results in certain instances are enhanced when heat is applied, e.g., the temperature is raised to 1,000° C. An atmosphere of nonreactive gas, preferably selected as hereinafter stated, is retained at the end of this period, and preferably the pressure is increased to 3-5 atmospheres. For molybdenum and zirconium an atmosphere comprising 5-15 percent hydrogen in helium has been found to produce the most adherent coatings. In the case of niobium, an atmosphere of nitrogen is used to obtain the best results.

The temperature of the furnace is now raised quickly to a point at which carburization takes place. This may be slightly below the melting point, 2,400° to 2,500° C for each of the metals named, or above the melting point. In each instance the metal and/or carbon undergo a diffusion process which terminates when the carbon and metal react to form the carbide. In general the lowest temperatures at which carburization takes place are optimum since the reaction rate is slowest at this temperature and hence the diffusion process is more complete. The temperature is maintained for 5 to 15 minutes, after which time the carburization is complete.

Upon dismantling the assembly or removal of the tube from the furnace there is found a graphite tube in which the mandrel is completely bonded to the interior thereof by the carburized metal coating. The mandrel must therefore ordinarily be removed by mechanical means, e.g., sandblasting, drilling, etc. However, the mandrel generally separates from the carbide coating upon the cooling of the assembly when certain combinations of foils are used in the carburization steps. Specifically, the mandrel remains free when a niobium foil 5 mils thick on the mandrel is further wrapped with a one mil molybdenum foil and carburized at a temperature of about 2,350° C in an atmosphere of nitrogen.

EXAMPLE

A quantity of ¾ inch graphite tubes 18 inches long and having ¼ inch bores therethrough were cleaned with tertiary butyl alcohol and fitted with graphite mandrels having varying tolerances up to about 25 mils. The mandrels were each wrapped with a single wrap of molybdenum, niobium, or zirconium foil, respectively, from 1 to 20 mils thick, e.g., as set forth in the representative examples in the table below, the smaller mandrels having the thicker foils. The mandrels were then inserted in the proper tubes to provide tolerances of about one mil between the foils and the tubes. The assemblies were then singly processed in a carbon resistance furnace in which the graphite tube acted as an electrode. The entire furnace was equipped for evacuation and maintenance of a gas atmosphere selected according to the metal used as shown in the table. The furnace was first evacuated to a pressure of 100 microns three times for several minutes each time, being flushed with the respective gas selected after each evacuation. Thereafter the furnace (including the space between metal and graphite tube) was pressurized with a gas selected at a pressure of 3 to 5 atmospheres. The furnace was then energized and the temperature raised to the carburization point or slightly beyond. After carburization the tubes were allowed to cool and were removed from the furnace. The mandrel was in each instance removed by drilling, and the coating was then inspected both before and after sawing the tubes longitudinally, by visual and X-ray means. In every instance the coating adhered well where the conditions as reported were maintained and the carbide could not be removed without destruction of the graphite to which it adhered.

| Exp. No. | Metal | Metal Thickness (mils) | Gas | Pressure (psia) | Temp. (° C) | Remarks |
|---|---|---|---|---|---|---|
| ZR 11 | Mo | 5.0 | 7.7 mol % | 65 | 2200 | Excellent |

| Exp. No. | Metal | Metal Thickness | Gas | Pressure | Temp. | Remarks |
|---|---|---|---|---|---|---|
| ZR 38 | Nb | 5.0 | $H_2$ in He $N_2$ | 65 | 2450 | adhesion Excellent |
| ZR 37 | Zr | 5.0 | 8 mol % $H_2$ in He | 55 | 1900 | adhesion Excellent adhesion* |

* Temperature increased to 2350° C after 12 minutes

While the invention has been described with respect to several preferred embodiments, it will be apparent to those skilled in the art that numerous variations and modifications may be made within the spirit and scope of the invention and thus it is not intended to limit the invention except as defined in the following claims.

What is claimed is:

1. A process for coating graphite with an adherent, continuous layer of metallic carbide comprising the steps of disposing a quantity of metal selected from the group consisting of molybdenum, niobium and zirconium in contiguous gas permeable relation with a first piece of graphite, superimposing a graphite clamping means of identical surface shape over said metal and said graphite piece, adjusting said graphite clamping means and said graphite piece to maintain a tolerance of about 1 mil between said metal and at least one contiguous graphite surface degassing said assembly, enclosing said graphite-metal interfaces within a nonreactive gaseous atmosphere, quickly heating said assembly to a temperature at which said metal carburizes, cooling said assembly and mechanically separating and removing said graphite clamping means from said adherent coating.

2. The process of claim 1 in which said metal is molybdenum and said nonreactive gas is 5 to 15 percent hydrogen in helium.

3. The process of claim 1 in which said metal is niobium and said nonreactive gas is nitrogen.

4. The process of claim 1 in which said metal is zirconium and said nonreactive gas is 5 to 15 percent hydrogen in helium.

5. A process for coating graphite tubes with an adherent, continuous layer of metallic carbide comprising the steps of wrapping in overlapping relation a sheet of metal foil selected from the group consisting of Zr, Nb and Mo tightly and evenly about a graphite mandrel, said mandrel being sized for a close tolerance between said foil and said tube when inserted therein together with said foil, inserting said foil and said mandrel within said tube, degassing said assembly, enclosing said graphite-metal interface within a nonreactive gaseous atmosphere, quickly heating said assembly to a temperature at which said metal carburizes, cooling said assembly and mechanically separating and removing said graphite mandrel from said tube.

6. The process of claim 5 in which said metal foil is from 1 to 20 mils thick.

7. The process of claim 5 in which the tolerance between said metal foil wrapped about said mandrel and said tube is about 1 mil.

8. The process of claim 5 in which the gaseous pressure is 3 to 5 atmospheres.

9. The process of claim 5 in which said assembly is degassed by evacuating to a pressure of 100 microns Hg, flushing with a nonreactive gas, and repeating said evacuating and flushing steps at least two times.

10. The process of claim 5 in which said metal is molybdenum and said nonreactive gas is 5 to 15 percent hydrogen in helium.

11. The process of claim 5 in which said metal is niobium and said nonreactive gas is nitrogen.

12. The process of claim 5 in which said metal is zirconium and said nonreactive gas is 5 to 15 percent hydrogen in helium.

13. The process of claim 5 in which said graphite mandrel is removed by drilling.

14. The process of claim 5 in which said graphite mandrel is removed by sandblasting.

15. A process for coating graphite tubes with an adherent, continuous layer of metallic carbide comprising the steps of disposing a sheet of metal 1 to 20 mils thick selected from the group consisting of molybdenum, zirconium and niobium tightly and evenly once about a graphite mandrel, said mandrel being sized for a tolerance of the order of 1 mil between said foil and said tube when inserted therein together with said foil, inserting said foil covered mandrel within said graphite tube, evacuating said assembly to a pressure of 100 microns Hg, flushing said assembly with a nonreactive gas, repeating said evacuating and flushing steps at least two times, pressurizing said assembly with 3 to 5 atmospheres of a gas selected from the group consisting of 5 to 15 percent hydrogen in helium, and nitrogen, said first gas being selected when the metals Mo and Nb are selected and said second gas being selected when said metal Nb is selected quickly heating said assembly to a termperature between 2,400° and 2,500° C, maintaining said temperature for at least 5 minutes, cooling said assembly, and separating and removing said mandrel from said tube by drilling therefrom.

* * * * *